United States Patent [19]

Alleman et al.

[11] 4,050,394
[45] Sept. 27, 1977

[54] CAN FABRICATION SYSTEM

[75] Inventors: Raymond J. Alleman, Evergreen Park; Raymond T. Batina, Homewood; Ralph J. Clark, Tinley Park, all of Ill.

[73] Assignee: Libby, McNeil & Libby, Worth, Ill.

[21] Appl. No.: 675,276

[22] Filed: Apr. 9, 1976

[51] Int. Cl.² .......................... B21D 51/26; B23K 3/00
[52] U.S. Cl. .................................. 113/120 R; 113/8; 113/12; 228/21; 228/125
[58] Field of Search .............. 113/8, 11 R, 11 A, 12, 113/14 R, 14 A, 7 R, 7 A, 1 M, 27, 116 W, 120 K; 228/21, 22, 23, 125

[56] References Cited

U.S. PATENT DOCUMENTS

| | | | |
|---|---|---|---|
| 1,702,745 | 2/1929 | Preston | 228/23 |
| 2,161,839 | 6/1939 | Woolford | 228/21 |
| 2,275,415 | 3/1942 | Boone | 228/21 |
| 2,433,068 | 12/1947 | Sedwick | 228/21 |
| 2,460,327 | 2/1949 | Woolford | 228/21 |
| 2,567,264 | 9/1951 | Winters et al. | 228/21 |
| 2,650,178 | 8/1973 | Martin et al. | 113/7 R |
| 2,795,002 | 6/1957 | Davies | 228/125 |
| 2,881,729 | 4/1959 | Geertsen | 228/21 |
| 3,148,648 | 9/1964 | Scholtz | 228/21 |
| 3,282,491 | 11/1966 | Wallace | 228/22 |

Primary Examiner—Michael J. Keenan
Attorney, Agent, or Firm—Jerold A. Jacover

[57] ABSTRACT

An article of manufacture for shielding the interior of each of a succession of container bodies from impurities present during fabrication is disclosed. The article has a base plate having a distal end and a first impurity deflection member extending downwardly therefrom at an obtuse angle with the base plate. The first impurity deflection member is adapted to be disposed adjacent to a forward open end of one of the succession of container bodies during a predetermined sequence of fabrication to prevent impurities from passing into that container body through the forward end thereof.

12 Claims, 10 Drawing Figures

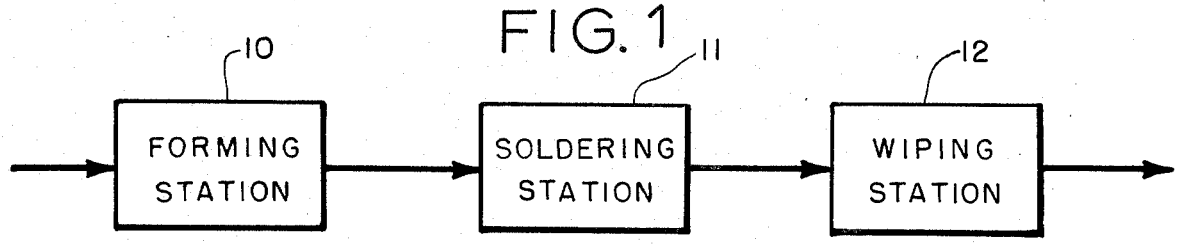
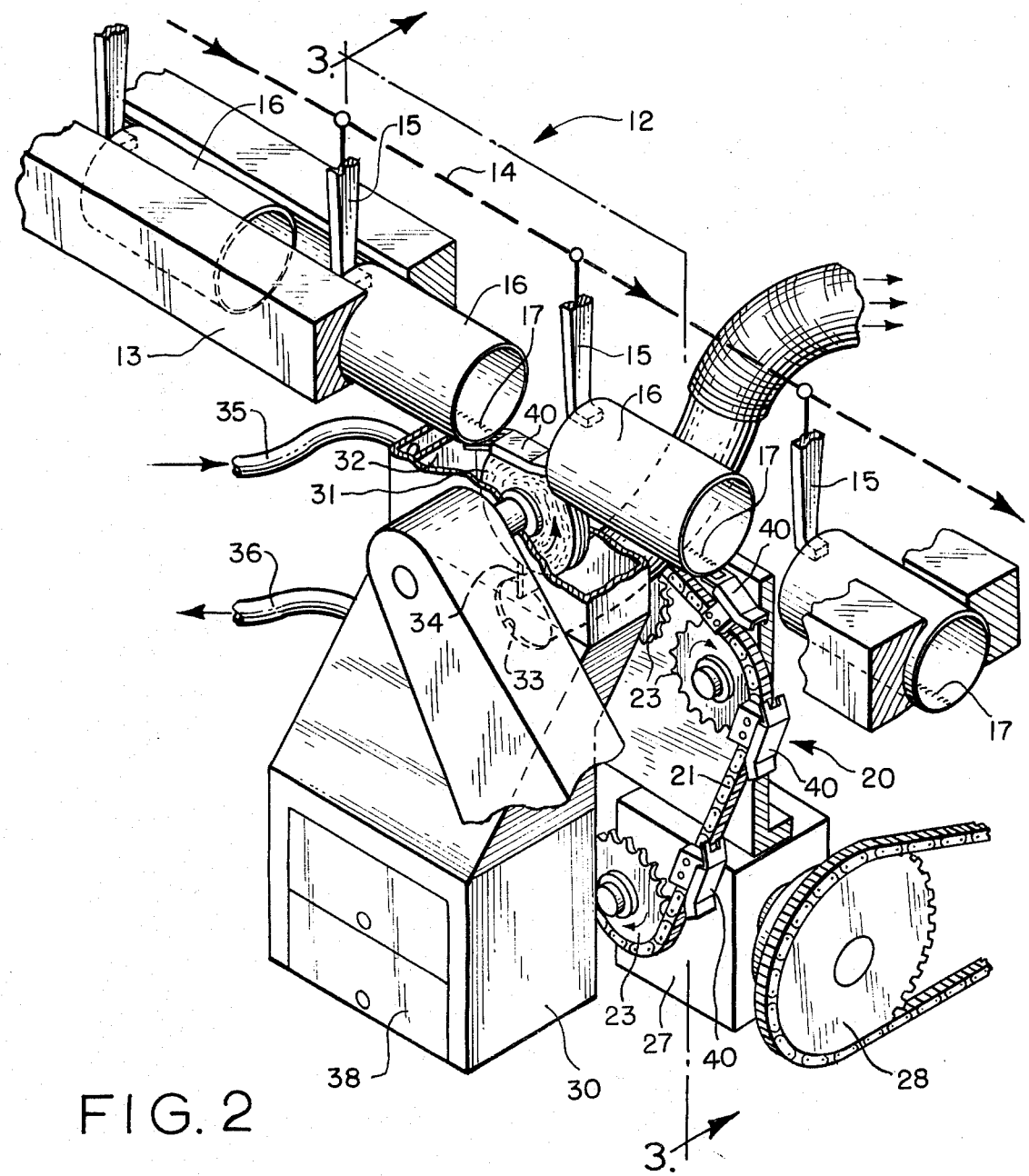

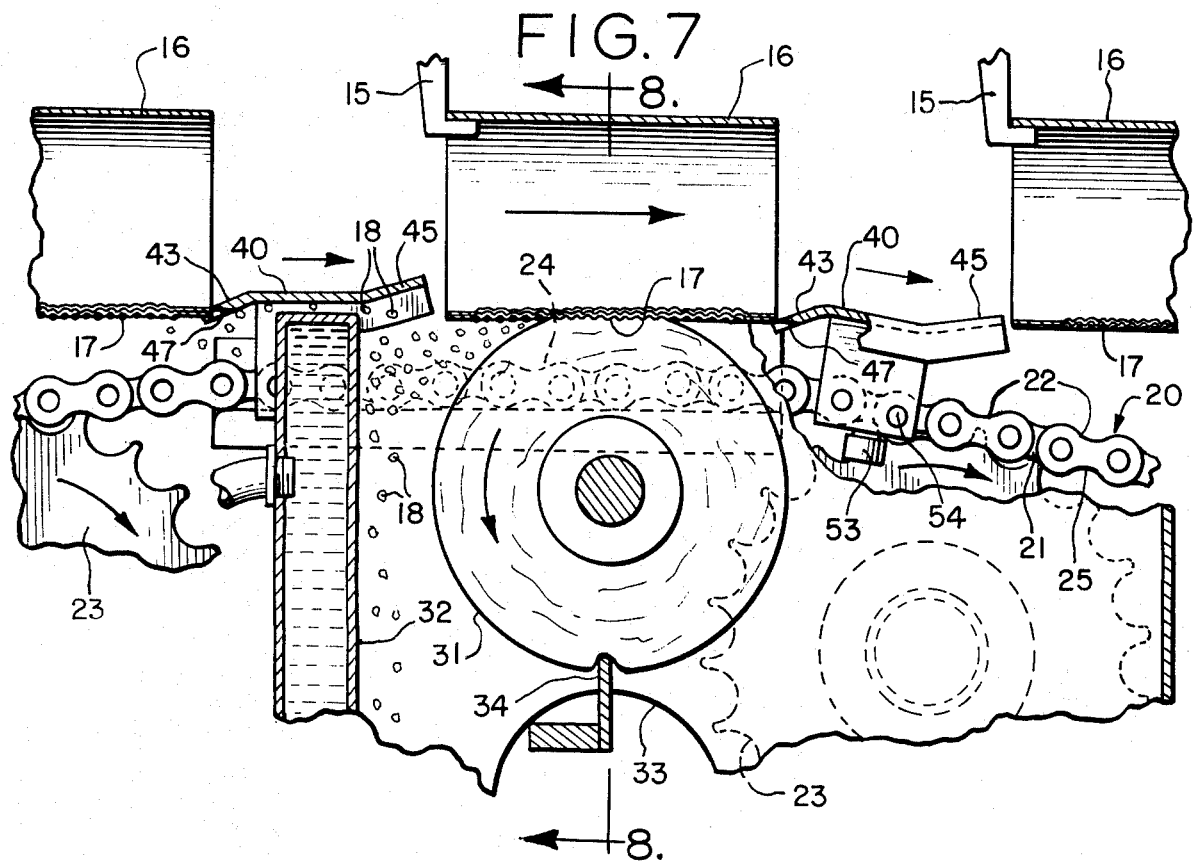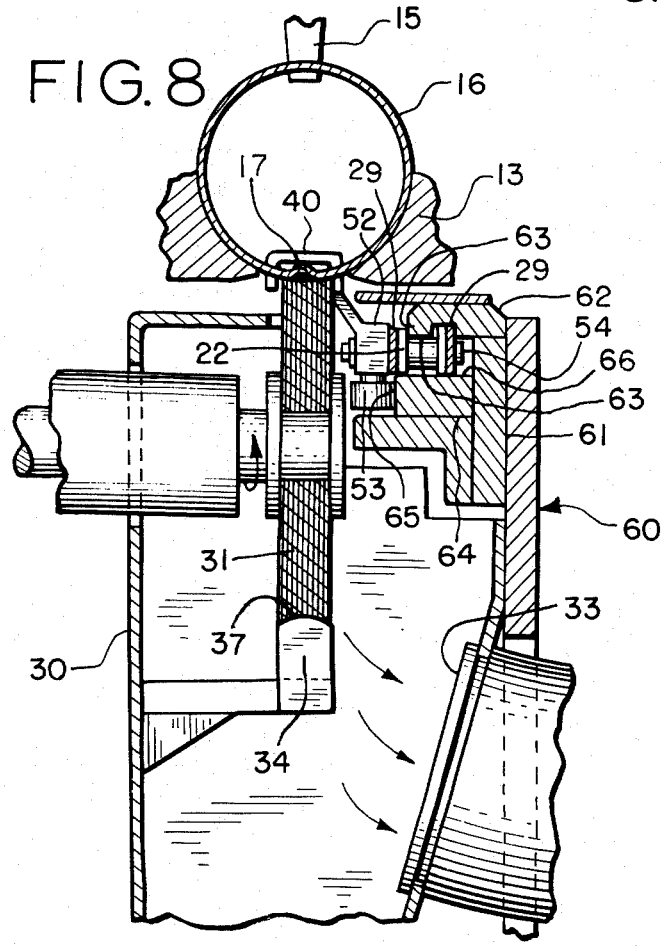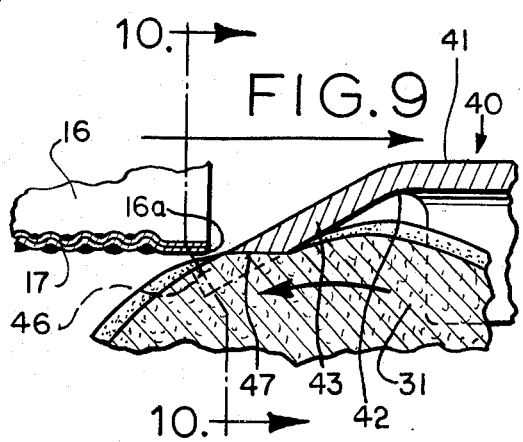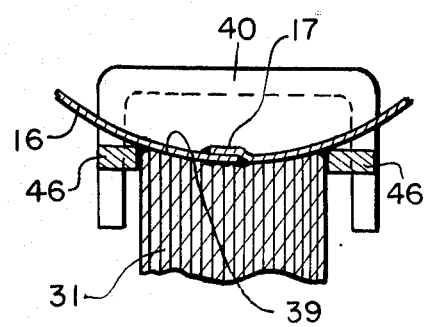

CAN FABRICATION SYSTEM

BACKGROUND OF THE INVENTION

This invention relates to improvements in machines for mass producing containers such as metal cans. In the mass production process currently employed, pre-sized sheets of metal are generally formed into hollow, cylindrical container bodies with the facing longitudinal edges of each body defining an interlocking seam. The seam is typically sealed with airhardened molten material such as solder, and thereafter the excess solder is generally removed by physically wiping the seam with an appropriate buffer.

In modern can fabricating systems, the manufacturing process is virtually completely automatic. Moreover, it is not uncommon for such systems to produce cans at a prodigious rate, one system operating at the remarkable speed of about 425 cans per minute. Such high speed systems generally require that the container bodies be transported to and from the various fabrication stations at closely-spaced intervals.

Though the close spacing of the container bodies contributes to the prodigious rates of can production, it is not without concomitant problems. In particular, during the fabrication sequence when excess solder is removed by physically wiping the seam with an appropriate buffer, the molten, or quasi-molten solder material is automatically thrown from the seam in a somewhat indiscriminate manner. Some of this solder material, sometimes referred to as "tramp lead" because solder generally consists, at least partially of lead, is directed toward the container bodies immediately following or preceding the particular body being wiped. Since, at this stage of the fabrication process, ends have not yet been secured to the container bodies, some of this tramp lead lands, and hardens, on the interior walls of the container bodies. Lead-containing solder is, of course, a toxic material, and therefore this is a very undesirable result, particularly when the completed cans are filled with food for human consumption.

In the past, a number of methods have been employed to prevent tramp lead from landing inside the container bodies. These methods have included attempts to intermittently move a shield-like article between adjacent container bodies during the wiping sequence. Such shields have typically been moved into position through means of a moving belt, gears and the like. Unfortunately, these prior attempts have not met with great success.

Accordingly, it is a primary object of this invention to provide an improved can fabricating system which effectively prevents tramp lead and other spurious substances from landing inside container bodies during the seam-wiping sequence previously described. The improved system does not reduce the relatively high rate of can production achieved heretofore, yet it can be installed in existing can fabrication machinery with only minimal modifications.

It is another object of the invention to provide an improved article of manufacture for shielding the interior of each of a succession of container bodies from impurities present during the fabrication process, and to further provide an improved can fabricating process for effectively minimizing the amount of impurities which may land inside a container body during fabrication thereof. Other objects, features and advantages of the invention will be apparent hereinafter.

SUMMARY OF THE INVENTION

In accordance with the foregoing objects, there is provided in one aspect of the invention, an article of manufacture for shielding the interior of each of a succession of container bodies from impurities present during fabrication. The article comprises a base plate having a distal end, and an impurity deflection member extending downwardly therefrom at an obtuse angle with the base plate. The impurity deflection member is adapted to be disposed adjacent to a forward open end of one of the succession of container bodies during a predetermined sequence of fabrication to prevent impurities from passing into one of the container bodies through the forward open end thereof.

BRIEF DESCRIPTION OF THE DRAWINGS

The invention summarized above can be best understood by reading the following detailed description in conjunction with the accompanying drawings in which:

FIG. 1 is a block diagram representing certain functional operations in an exemplary can fabricating system;

FIG. 2 is a perspective view of an exemplary wiping station shown in block form in FIG. 1;

FIG. 7 is an enlarged front view of a portion of the wiping station shown in FIG. 2;

FIG. 8 is a sectional view taken along lines 8—8 of FIG. 7;

FIG. 9 is an enlarged view of a container body advancing through a portion of the wiping station shown in FIG. 2; and FIG. 10 is a sectional view taken along lines 10—10 of FIG. 9.

Detailed Description of an Exemplary Embodiment

Figure 3:
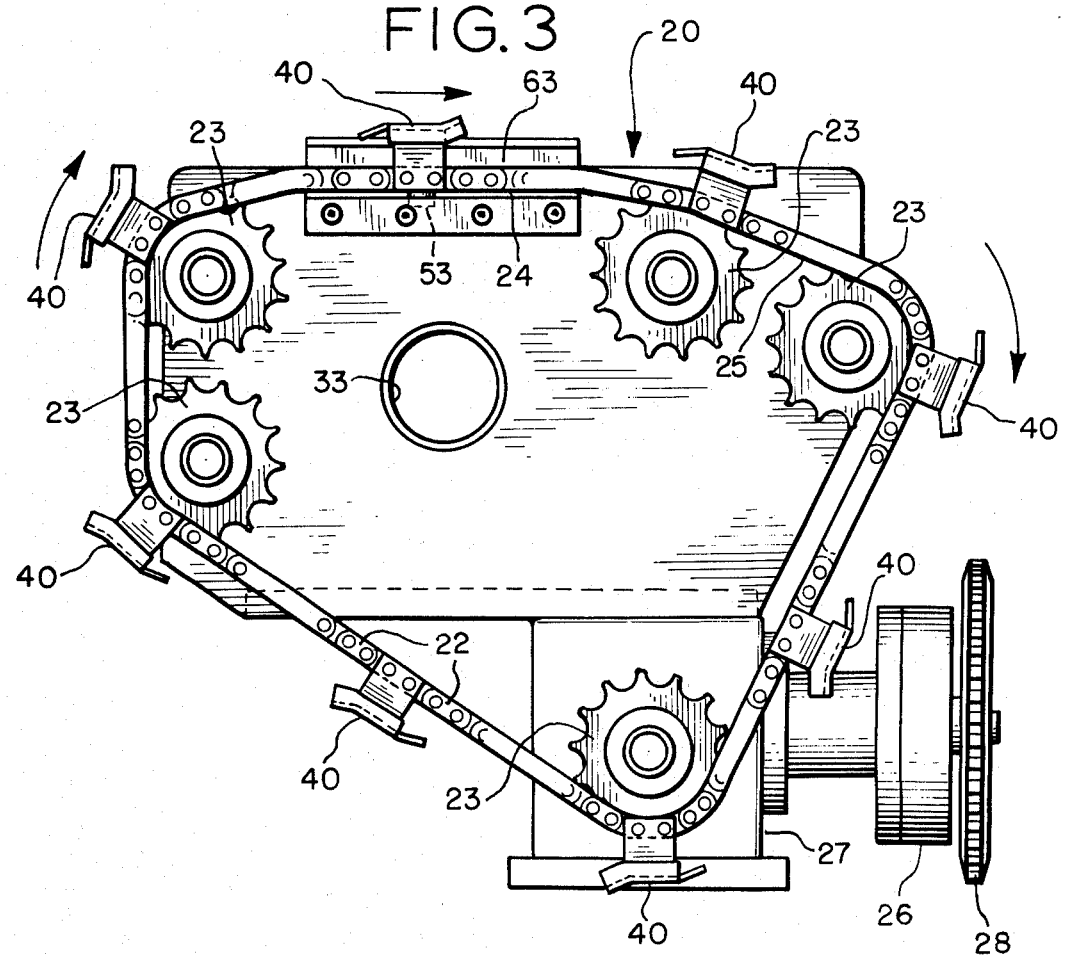
FIG. 3 is an enlarged, front view of a sub-assembly of the wiping station shown in FIG. 2, taken across lines 3—3 thereof.

The general environment of an exemplary embodiment of the can fabricating system of the invention can be understood by referring to FIG. 1 which shows in sequence a forming station 10, a soldering station 11, and a wiping station 12. Forming station 10 is adapted to receive, in relatively rapid, spaced succession, a plurality of pre-sized metal sheets which are to be formed into hollow, open-ended, cylindrical container bodies. Each container body is formed with an interlocking longitudinal seam which is sealed by air-hardenable molten means, such as solder, at soldering station 11. Excess solder is removed from the longitudinal seam of each container body at wiping station 12.

An exemplary embodiment of wiping station 12 is illustrated in FIG. 2. In particular, wiping station 12 includes a guide 13, open at the top and bottom, having a configuration adapted to accommodate a succession of open-ended container bodies 16. Each of container bodies 16 is pushed through guide 13 by a corresponding dog 15 hanging in predetermined spaced relation from a conveyor 14. The spaced relationship of dogs 15 thus determines the spacing of container bodies 16 as they pass through guide 13, and the speed of conveyor 14 determines the rate at which can bodies 16 are fabricated.

As explained above, each of container bodies 16 is passed to wiping station 12 from soldering station 11 where a longitudinal seam 17 is preferably sealed by the application of solder thereto. When container bodies 16 reach wiping station 12, with longitudinal seam 17 in a downward orientation as shown in FIG. 2, the solder applied to seam 17 is still in a molten or quasi-molten state. In this exemplary embodiment this molten or quasi-molten state is assured through the use of special heating means (not shown) interposed between stations 11 and 12 to re-soften the hardened solder.

Because the solder applied to longitudinal seam 17 of each of container bodies 16 is in a molten, or quasi-molten state, excess amounts of solder or tramp lead can be readily wiped away. In this exemplary embodiment, the wiping function is accomplished by wiping means in the form of a circular cotton buffer 31. Buffer 31 is adapted to rotate counterclockwise (looking at FIG. 2), and being appropriately disposed under guide 13 in alignment with each longitudinal seam 17 of the bodies 16, it effectively removes tramp lead therefrom. The tramp lead is thrown from each of container bodies 16 in a somewhat indiscriminant manner. However, as explained in greater detail hereinafter, means are provided for preventing this tramp lead from landing and hardening inside an adjacent container body.

As shown in FIG. 7, much of the tramp lead 18 thrown off by buffer 31 strikes a double-walled splatter plate 32. Plate 32 is surrounded by an enclosure 30, depicted in FIG. 2, and is arranged to have a fluid inlet 35 and a fluid outlet 36 so that a coolant, such as water, can be circulated through plate 32 to reduce the temperature thereof. As a result, molten or quasi-molten tramp lead 18 striking plate 32 immediately hardens, and then falls to the bottom of enclosure 30. Located at the bottom of enclosure 30 is a drawer 38 where the hardened tramp lead can be readily collected for removal and reuse if desired.

Also disposed inside enclosure 30, in contacting relationship with buffer 31 is a rigid scraper 34. Scraper 34 preferably has a convex top 37 (see FIG. 8) for forming and maintaining a somewhat concave wiping surface 39 in cotton buffer 31. This concave wiping surface 39 of buffer 31 substantially conforms to the curved contour of each of container bodies 16 to facilitate the removal of tramp lead therefrom. Scraper 34 also serves to loosen any spurious substances adhering to beffer 31. These loosened substances are then removed via an exhaust 33. Since these loosened substances, along with all of the tramp lead 18 striking splatter plate 32 are confined within enclosure 30 until properly disposed of, they will not interfere with the operation of the can fabrication system, nor will they land inside any of the container bodies 16 moving through wiping station 12.

The means for shielding adjacent container bodies from the tramp lead removed by buffer 31 are best illustrated in FIGS. 3 and 7. More particularly, these figures depict a sub-assembly 20 having an endless belt 21 comprising a plurality of chain links 22 characterized by a pair of protuberances 29 (FIG. 8). Endless belt 21 is supported by a plurality of sprockets 23 and is preferably driven via a clutch 26 and a gear box 27 by any suitable drive means 28. Thus, endless belt 21 is driven in a clockwise direction (looking at FIG. 3) at a precise predetermined rate determined by clutch 26, gear box 27 and drive means 28.

Sprockets 23 of sub-assembly 20 are preferably flame hardened, and are arranged so that endless belt 21 defines an upper linear transmission portion 24, and a gradually declining transmission portion 25. Linear transmission portion 24 of endless belt 21 moves substantially parallel to the line of movement of container bodies 16, while gradually declining transmission portion 25 forms an acute angle therewith. Sprockets 23 are further arranged so that linear transmission portion 24 of endless belt 21 is displaced a precise predetermined distance relative to the line of movement of container bodies 16.

Figure 4:
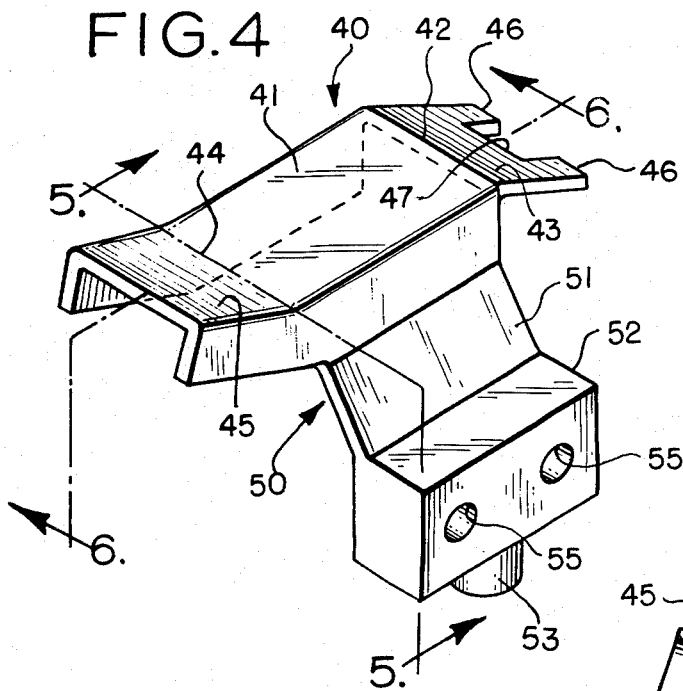
FIG. 4 is an enlarged perspective view of an exemplary article of manufacture used in the sub-assembly shown in FIG. 3.
Figure 5:
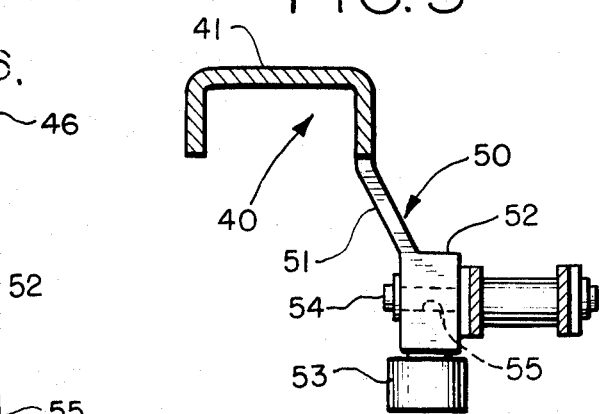
FIG. 5 is a sectional view of the article of manufacture shown in FIG. 4, taken along lines 5—5 thereof.
Figure 6:
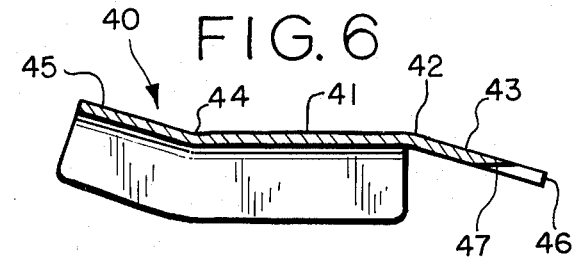
FIG. 6 is a sectional view of the article of manufacture shown in FIG. 4, taken along lines 6—6 thereof.

Secured to endless belt 21 in precise predetermined spaced relation, are a plurality of precision articles represented generally by reference numeral 40. Articles 40 are illustrated in greater detail in FIGS. 4-6, and reference should now be made thereto. In particular, articles 40 are comprised of a base plate 41 having a distal end 42 and a proximal end 44. Extending downwardly from distal end 42, at an obtuse angle with base plate 41, is a substantially U-shaped first impurity deflection member 43. Similarly, a second impurity deflection member 45 extends upwardly from proximal end 44, at an obtuse angle with base plate 41. Depending from first impurity deflection member 43 are a pair of spaced arms 46 of predetermined dimensions. Arms 46 define an intermediate portion including a beveled transition edge 47 whose purpose is explained hereinafter.

Each of articles 40 further includes securing means 50 comprising an integral side member 51 depending from base plate 41, and an attachment member 52 integrally formed with side member 51. Depending from attachment member 52 is a roller 53 which serves to prevent article 40 from undergoing any undesirable transverse shift in a manner explained hereinafter. Defined in each attachment member 52 is a pair of openings 55 adapted to attachingly receive a pin 54 which passes through each of chain links 22. When pins 54 are so attached to securing means 50 at attachment members 52, articles 40 are maintained in a desired location and orientation on endless belt 21.

Referring now to FIG. 8, there is shown a framework 60 which serves to maintain articles 40 in proper alignment when they move through the linear transmission portion 24 of endless belt 21. In particular, framework 60 includes an upstanding member 61, having a horizontal member 62 of predetermined dimensions. Depending from horizontal member 62 is a link-engaging finger 63 which is captured between the protuberances 29 of chain links 22. Also extending horizontally from upstanding member 61 is a parallel member 64 which has a side surface 65 and a top surface 66. It should thus be apparent that finger 63 and top surface 66 limit the chain links 22 which comprise endless belt 21 to a predetermined horizontal path at a precise vertical spacing relative to the line defined by the movement of container bodies 16. This horizontal path defines the linear transmission portion 24 of endless belt 21. If desired a second finger (not shown) extending upwardly from surface 66 between protuberances 29, could be employed to more precisely define the path of movement of chain links 22.

It should be recalled that articles 40 are secured in predetermined spaced relationship to selected chain links 22 via pins 54. Accordingly, when any particular one of articles 40 are carried by endless belt 21 through linear transmission portion 24, it is also maintained at a precise vertical spacing relative to the line defined by the movement of container bodies 16. To prevent articles 40 from experiencing any transverse shift (tilting or disorientation relative to the vertical axis) during their movement through linear transmission portion 24 of endless belt 21, the side surface 65 of parallel member 64 is arranged to contact article 40 as shown in FIG. 8. Since such contact is made with roller 53, each of articles 40 travels through linear transmission portion 24 with minimal friction, minimal disorientation, and precision spacing relative to the line defined by the movement of container bodies 16. If desired roller 53 can also be contacted by the vertical side surface of a second parallel member (not shown), extending parallel to and in facing relationship with side surface 65.

By proper choice of the number and spacing of articles 40 on endless belt 21, the speed and spacing of container bodies 16, and the loop length and speed of endless belt 21, articles 40 and container bodies 16 can be synchronized so that one of articles 40 always moves through linear transmission portion 24 between a leading and trailing pair of container bodies 16. The orientation of article 40 during such movement through linear transmission portion 24 is shown in greatest detail in FIGS. 9 and 10. In particular, one of articles 40 is timed to arrive at linear transmission portion 24 so that arms 46 of first impurity deflection member 43 will be in aligned relationship with the lower leading edge 16a of a particular one of container bodies 16. Moreover, the beveled edge 47 between arms 46 is maintained a predetermined small distance, preferably on the order of one-sixteenth of an inch, from lower leading edge 16a. The container body 16, and the associated article 40, move relative to the linear transmission portion 24 of endless belt 21 in this orientation as buffer 31 commences wiping a seam 17 of a particular container body 16.

As illustrated in FIGS. 9 and 10, the concave wiping surface 39 of buffer 31 passes between arms 46 of article 40 and is guided onto seam 17 by beveled edge 47 without forcefully contacting lower leading edge 16a of the container body 16. Thus, buffer 31 begins wiping seam 16 very near lower leading edge 16a, thereby removing a maximum amount of tramp lead. However, since buffer 31 does not forcefully contact edge 16a, substances adhering to buffer 31, which would be loosened and scattered by such contact, are not deposited inside container body 16.

The orientation of articles 40 between a leading and trailing pair of container bodies 16 further prevents tramp lead from being thrown therein. Thus, as shown in FIG. 7, the tramp lead 18 wiped from the seam 17 of a leading container body can be thrown under a particular article 40 interposed between the leading container body and an adjacent trailing container body. However, the orientation of article 40, and particularly the first impurity deflection member 43 thereof, shields the interior of the trailing container body from such tramp lead 18. Similarly, it should be noted that the orientation of the second impurity deflection member 45 of a particular article 40 prevents tramp lead and other spurious substances from entering a leading container body while the seam of an adjacent trailing container body is being wiped by buffer 31. After a container body has been wiped, the particular article 40 interposed between that body and an adjacent leading container body is moved into the gradually declining transmission portion 25 of endless belt 21 to facilitate withdrawl of that article 40 from its position between the two container bodies. The container bodies, with the tramp lead removed, continue to the next station in the fabrication system, while the withdrawn article 40 moves around endless belt 21 until it eventually returns to the linear transmission portion 24 for interposition between another pair of container bodies.

In view of the foregoing, it should be clear that the can fabricating system herein disclosed achieves a highly advantageous result with minimal modification of existing machinery. It should also be clear, however, that numerous modifications and refinements of the system which do not part from the true scope of the invention will be apparent to those skilled in the art. Accordingly, all such modifications and refinements are intended to be covered by the appended claims.

We claim:

1. In combination:

an article of manufacture for shielding the interior of one of a succession of container bodies from impurities present during the fabrication thereof comprising base means and a substantially U-shaped first impurity deflection member having a pair of arms and an intermediate portion defining a transition edge, extending from said base means;

means for wiping the exterior of said container bodies;

means for moving said transition edge of said impurity deflection member in close predetermined spaced relation with an edge defining a forward open end of said one of said succession of container bodies thereby defining an air gap between said transition edge and said edge defining said forward open end; and means for moving said succession of container bodies so that said wiping means can be guided from said transition edge over said air gap onto said one of said container bodies without substantial contact with said edge defining said forward open end, whereby said article of manufacture prevents impurities from passing into said one of said container bodies with minimal application of force thereto.

2. In combination:

an article of manufacture for shielding the interior of one of a succession of container bodies from impurities present during the fabrication thereof comprising base means having a distal end and a proximal end; a substantially U-shaped first impurity deflection member, having a pair of arms and an intermediate portion, extending downwardly from said distal end of said base means at an obtuse angle therewith, said intermediate portion of said first impurity deflection member defining a beveled transition edge; a second impurity deflection member extending upwardly from said proximal end of said base means at an obtuse angle therewith;

means for wiping the exterior of said container bodies;

means for moving said article of manufacture so that said beveled transition edge of said first impurity deflection member is in close predetermined spaced relation with an edge defining a forward open end of said one of said succession of container bodies thereby defining an air gap between said transition edge and said edge defining said forward open end; and so that said second impurity deflection member is disposed adjacent a rearward open end of a container body leading said one of said succession of container bodies; and means for moving said succession of container bodies so that said wiping means can be guided from said transition edge over said air gap onto said one of said container bodies without substantial contact with said edge defining said forward open end, whereby said article of manufacture prevents impurities from passing into said open end and further prevents said impurities from passing through said rearward open end of said leading container body.

3. The combination defined in claim 2 wherein said means for moving said article of manufacture includes an endless belt having means for securing said article of manufacture thereto, and means including a roller for preventing said article from undergoing any transverse shift.

4. In a container fabricating machine of the type having conveyor means for transporting a succession of container bodies in spaced relationship, means for sealing a seam in each of said bodies by the application of sealing material, and wiping means for removing excess amounts of said material, an apparatus for preventing said excess amounts of said material from being deposited inside any of said bodies, comprising:

an endless belt having a linear transmission portion adapted to move parallel to, and in predetermined spaced relationship with, the movement of said container bodies transported by said conveyor means;

a plurality of articles, secured to said endless belt, each of said articles comprising base means having a distal end and a proximal end; a substantially U-shaped first impurity deflection member, having a pair of arms and an intermediate portion defining transition edge, extending from said distal end, and a second impurity deflection member extending from said proximal end; and synchronizing means for assuring that one of said articles will move along said linear transmission portion of said endless belt between every two of said succession of container bodies so that said first impurity deflection member is in shielding relationship with a forward open end of the trailing one of said two container bodies to prevent impurities from passing into said trailing one of said container bodies through said forward open end thereof, and with said transition edge in close predetermined spaced relation with said forward open end thereby defining an air gap between said transition edge and said forward open end so that said wiping means can be guided from said transition edge over said air gap onto said trailing one of said two container bodies without substantial contact with the edge defining said forward open end; said synchronizing means further assuring that the second impurity deflection member of said one of said articles is in shielding relationship with a rearward open end of the leading one of said two container bodies, whereby said article of manufacture prevents impurities from passing into said one of said container bodies with minimal application of force thereto, and further prevents impurities from passing through said rearward open end.

5. The machine defined in claim 4 further including means including a roller for preventing said articles from undergoing any transverse shift.

6. The machine defined in claim 4 wherein said endless belt further includes a gradually declining transmission portion adapted to move said articles away from said container bodies without interfering with the movement thereof.

7. The machine defined in claim 4 further includes scraper means for loosening substances from said wiper means, exhaust means for disposing of the loosened substances, and means enclosing said wiper means, said scraper means and said exhaust means for preventing said loosened substances from contracting said articles.

8. The machine defined in claim 4 wherein said sealing material is applied to said seam as molten metal, and wherein said machine further includes a splatter plate arranged to intercept portions of said excess amounts of sealing material removed from said seam by said wiper means.

9. The machine defined in claim 8 further includes means for cooling said splatter plate, whereby any molten sealing material intercepted thereby is solidified for easy removal.

10. A process for fabricating a succession of container bodies each characterized by a longitudinal surface seam comprising the steps of:

applying sealing material at a sealing station to said longitudinal seam in each of said container bodies;

transporting said container bodies in spaced relationship from said sealing station to a wiping station;

successively interposing, at said wiping station, in the space between a leading and trailing container body, an article for shielding the interior of said trailing container body from impurities, comprising base means and a substantially U-shaped impurity deflection member, having a pair of arms and an intermediate portion defining a transition edge, extending from said base means;

moving said transition edge of said impurity deflection member into close predetermined spaced relation with an edge of said trailing container body defining a forward open end thereof, thereby defining an air gap between said transition edge and said edge of said trailing container body;

providing wiper means for wiping excess sealing material from said seam in said leading container body;

moving said wiping means relative to said trailing container body so that said wiping means is guided from said transition edge over said air gap onto said seam of said trailing container body without substantial contact with said edge defining said forward open end thereof, whereby impurities are prevented from passing into said trailing container body with minimal application of force thereto.

11. The process defined in claim 10 further includes the step of:

wiping said excess sealing material from the seam in said trailing container body.

12. The process defined in claim 11 further includes the step of:

gradually moving said article out of said close predetermined spaced relation with said edge of said trailing container body defining said forward open end thereof.

* * * * *